Oct. 7, 1952  C. A. BABBITT  2,613,303
PIPE WELDING MACHINE
Filed March 5, 1949 4 Sheets—Sheet 1
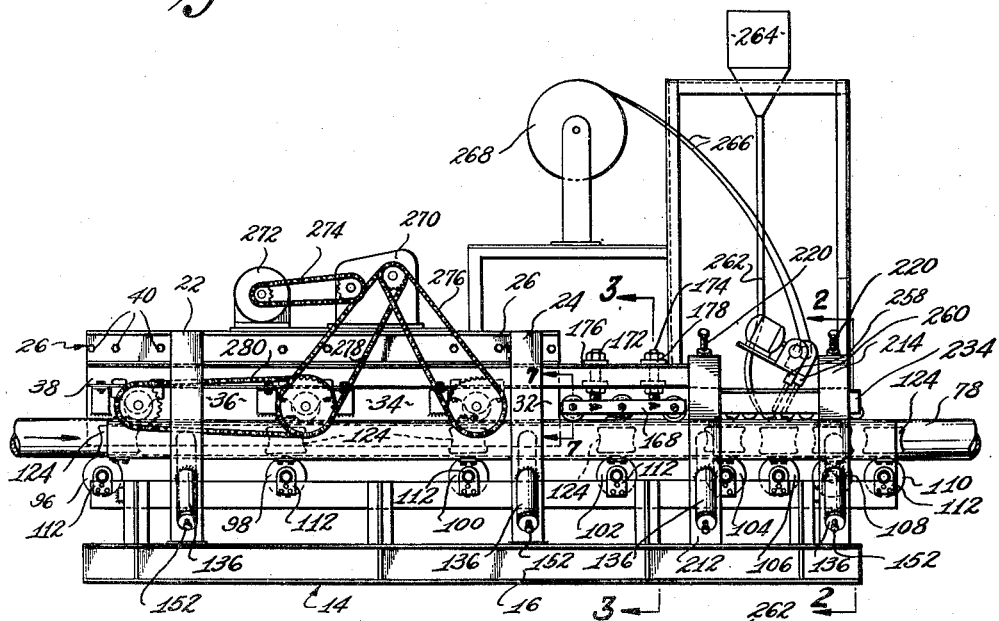
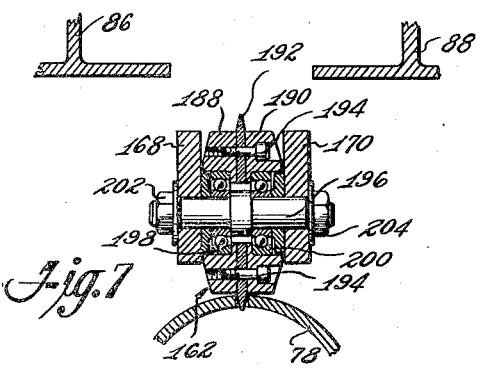
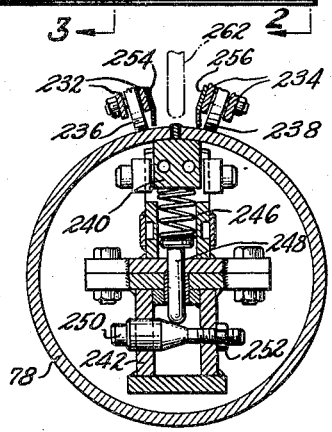
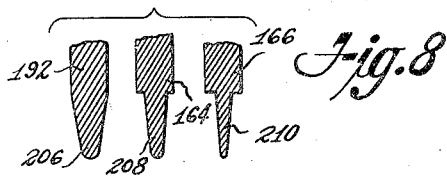
INVENTOR.
CHARLES A. BABBITT
BY Wm. Edward Hann
Attorney

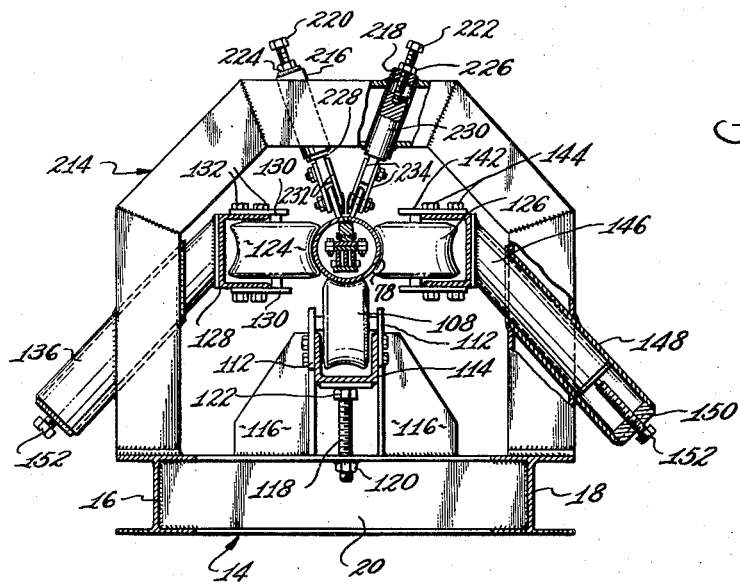
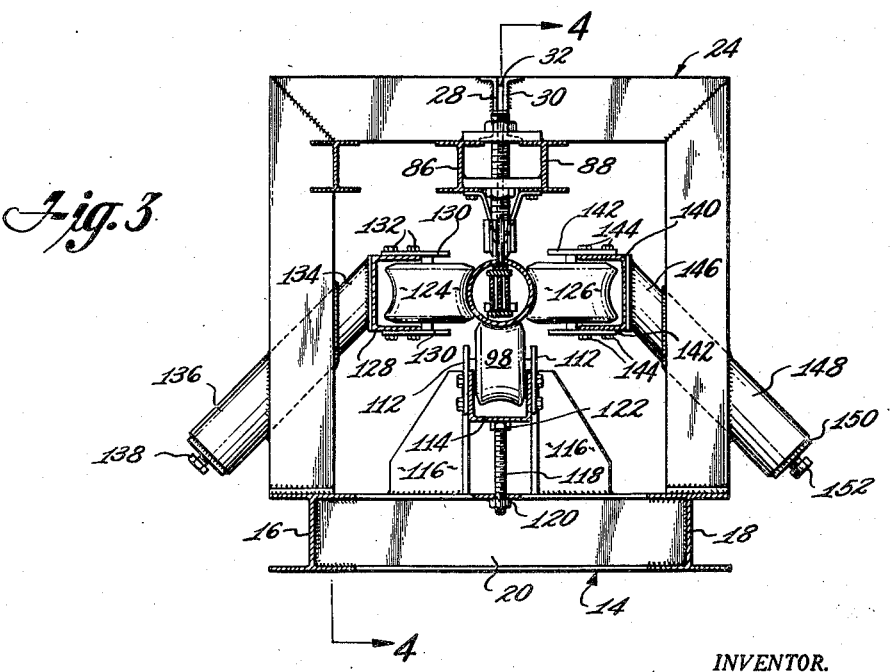

Oct. 7, 1952 C. A. BABBITT 2,613,303
PIPE WELDING MACHINE
Filed March 5, 1949 4 Sheets-Sheet 3
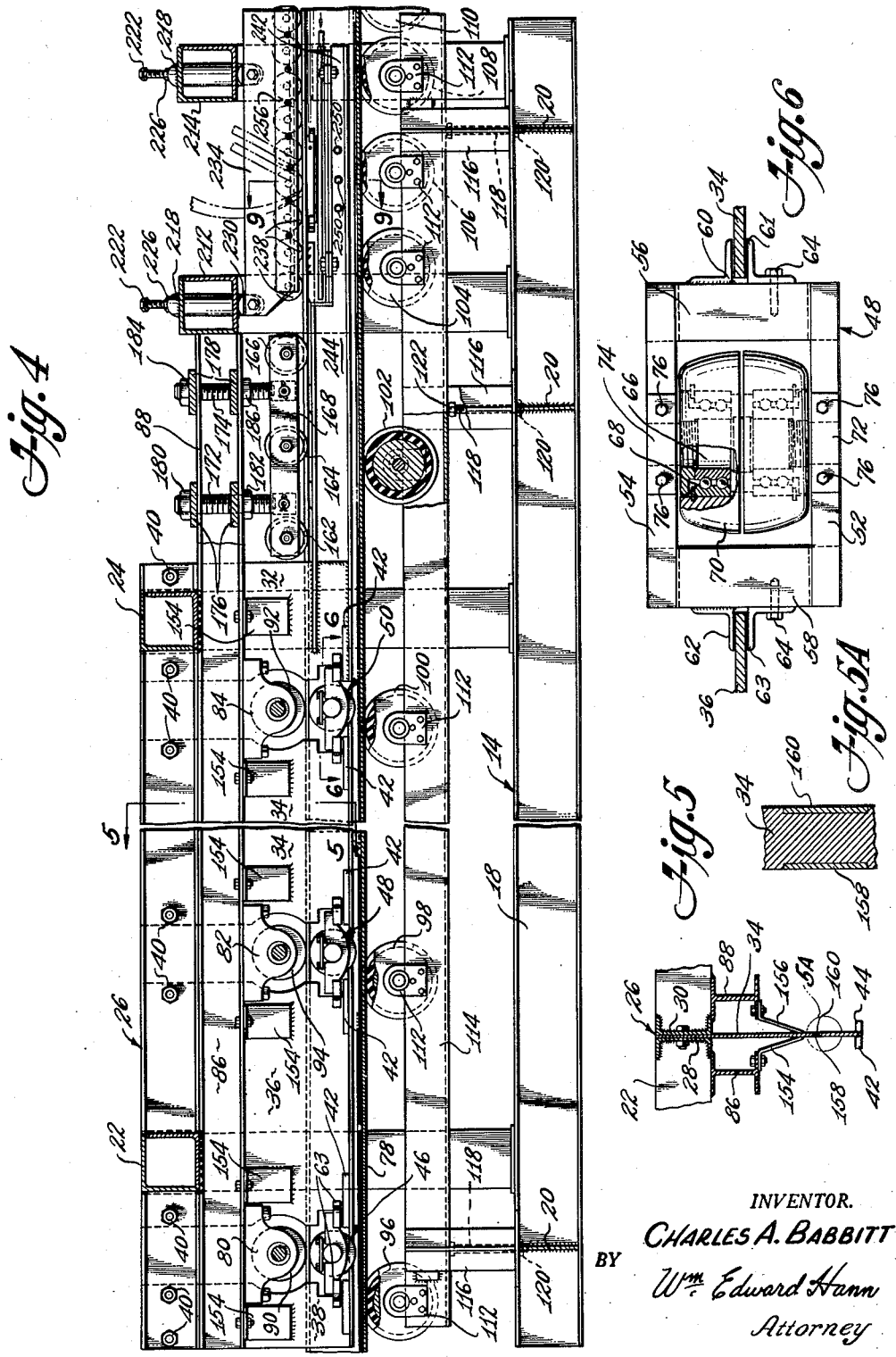
INVENTOR.
CHARLES A. BABBITT
BY
Wm Edward Hann
Attorney Oct. 7, 1952     C. A. BABBITT     2,613,303
PIPE WELDING MACHINE Filed March 5, 1949     4 Sheets-Sheet 4

INVENTOR.
CHARLES A. BABBITT
BY Wm. Edward Hann
Attorney

Patented Oct. 7, 1952

2,613,303

UNITED STATES PATENT OFFICE 2,613,303

PIPE WELDING MACHINE

Charles A. Babbitt, South Gate, Calif., assignor to Cal-Metal Corporation, Torrance, Calif., a corporation of California Application March 5, 1949, Serial No. 79,900

13 Claims. (Cl. 219—6)

This invention relates to a machine for forming and welding pipe or tubes from a rectangular sheet blank which has been preformed into a substantially cylindrical shape.

The main objects of this invention are: to provide a machine in the nature of a welding fixture which will feed preformed blanks to a series of forming rollers, and thereafter feed the work past automatic electric welders which close the seam and thus form a completed pipe; to provide a machine of this character in which the adjacent edges of the blank to be welded are rolled and shaped so as to be straight and uniform and free from waves or the like; to provide a machine of this character which will first prepare the edges to be welded and then straighten and align such edges and then press and hold such edges firmly on an electrode in the form of a shoe during the welding operation; to provide a machine of this character in which successive blanks may be fed in spaced relation to each other, and each is moved at an accelerated rate so as to catch up with and abut against the preceding workpiece, or blank, thus permitting a continuous and uninterrupted welding operation as the blanks move successively past the welding electrodes; and to provide a machine or fixture of this character which will accommodate and handle a large range of diameters of pipe by making easily effected adjustments and minor substitutions of parts in the machine.

An illustrative embodiment of this invention is shown in the accompanying drawings, in which:

Fig. 1 is a view in side elevation of the complete machine with a pipe blank passing therethrough and being welded into a completed tube or pipe;

Fig. 2 is an enlarged transverse vertical sectional view taken on the line 2—2 of Fig. 1, looking in the direction indicated by the arrows;

Fig. 3 is a similar view taken along the line 3—3 of Fig. 1, looking in the direction indicated by the arrows;

Fig. 4 is a vertical longitudinal view, partly in section and partly in elevation, taken generally along the line 4—4 of Fig. 3, looking in the direction indicated by the arrows;

Fig. 5 is a fragmentary, transverse, vertical sectional view taken on the line 5—5 of Fig. 4, looking in the direction indicated by the arrows;

Fig. 5A is a further enlarged fragmentary, sectional view of the construction enclosed within the broken circle 5A of Fig. 5;

Fig. 6 is an enlarged fragmentary view, partly in plan, and partly in section, taken along the line 6—6 of Fig. 4, looking in the direction indicated by the arrows;

Fig. 7 is an enlarged fragmentary, sectional view taken on the line 7—7 of Fig. 1, looking in the direction indicated by the arrows, and showing one of the guiding and aligning rollers;

Fig. 8 is an enlarged sectional, fragmentary view showing the cross-sectional shape of the three guiding and aligning rollers which extend into the open seam prior to welding, and which guide the adjacent edges of the blank into proper position for the welding operation;

Fig. 9 is an enlarged sectional view, taken on the line 9—9 of Fig. 4, looking in the direction indicated by the arrows, and showing how the hold-down rollers press the marginal edges of the pipe blank firmly on the back-up shoe;

Figure 10:
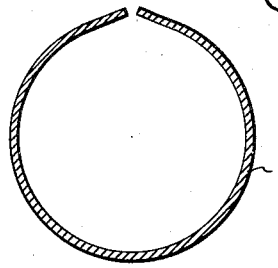
Fig. 10 is a transverse, sectional view of the pipe blank as it enters the welding machine or fixture.
Figure 11:
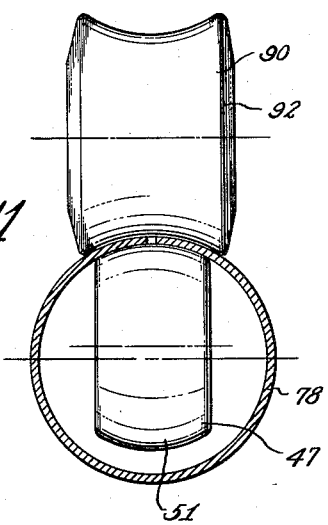
Figure 12:
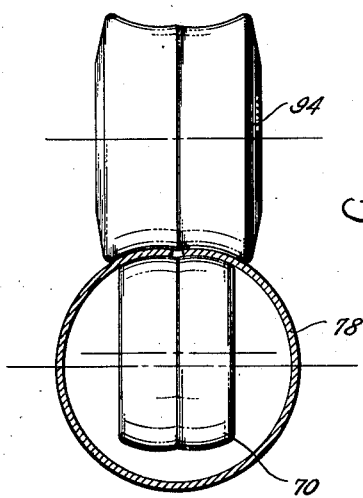

Fig. 11 is a similar view showing how the first and third sets of forming rollers shape the adjacent marginal edges of the blank to substantial cylindrical form; and Fig. 12 is a similar view showing how the second set of forming rollers shape the marginal edges of the blank inwardly beyond the circumference of a true circle, to be thereafter rolled outwardly as shown in Fig. 11, thus removing waves in the edges to be welded.

In the construction shown in the drawings, the pipe forming and welding machine, or fixture, comprises a base frame generally designated 14 formed of two laterally spaced parallel I-beams 16 and 18 rigidly joined by a plurality of transverse I-beams 20 welded thereto to form an elongated, generally rectangular and horizontally disposed base for supporting the various parts comprising the machine.

As shown most clearly in Figs. 1 and 3, the base frame has two longitudinally spaced, inverted U-shaped frames 22 and 24 mounted thereon and rigidly welded thereto supporting a horizontally disposed, longitudinally extending overhead beam generally designated 26. The beam 26 comprises a pair of outwardly facing channels 28 and 30 positioned vertically with their webs back-to-back and rigidly welded to the overhead supports 22 and 24. Vertically disposed, longitudinally extending spaced plates 32, 34, 36 and 38 have their upper marginal edges embraced between the webs of the channels 28 and 30 and are securely held therebetween by a plurality of bolts 40 which pass through the webs of the channels and through the plates.

The plates depend a substantial distance below the beam 26, and as shown particularly in Figs. 4 and 5, their lower edges adjacent their ends are provided with laterally extending ledges 42 and 44 rigidly welded thereto which support hold-up roller units generally designated 46, 48, and 50. The roller units 46, 48 and 50 are of identical construction, so that a detailed description of one will suffice for all.

As shown most clearly in Fig. 6, the unit 48 comprises spaced parallel side frames 52 and 54 having their ends resting upon and joined by cross members 56 and 58 to form a generally rectangular frame which loosely fits between the spaced vertical ends of the plates 34 and 36. The cross members 56 and 58 rest upon protruding ends of the ledges 42 and 44 and are thus supported by the overhead beam 26 through the medium of the plates 34 and 36. The outer sides of the cross members 56 and 58 are provided with two pairs of angle shaped guide brackets 60, 61, and 62, 63. The brackets 60 and 62 are welded in place, and the brackets 61 and 63 are secured by cap screws 64 for convenience of mounting.

One leg of each bracket is thus secured to the roller frame, while the other leg of each bracket extends outwardly on opposite sides of the plates 34 and 36, thereby permitting vertical movement for adjustment purposes, by placing rubber shims under the cross bars 56 and 58. By replacing these rubber shims with others of different thicknesses, the position of the roller may be varied, and thereby vary the compression loading during the rolling action hereinafter described.

The upper edges of the side bars 52 and 54 are notched out in horizontal alignment to receive the oppositely protruding ends of an axle shaft 66 which carries a pair of axially spaced double row ball bearings 68 upon which is journaled a back-up roller 70. Plates 72 and 74, secured by cap screws 76, span the notches and bear upon the ends of the shaft 66 for securing said shaft in place. As shown most clearly in Figs. 11 and 12, the rollers 47 and 51 of the units 46 and 50, respectively, have surfaces transversely curved on an arc of the interior diameter of the pipe 78 being formed, while the surface of the roller 70 is shaped so as to permit the marginal edges adjacent the seam to be rolled inwardly beyond a true circumference.

Cooperating driving roller units generally designated 80, 82, and 84 of substantially identical construction are mounted in vertical alignment above the units 46, 48, and 50, respectively. Each of the units 80, 82, and 84 comprise spaced parallel side plates bolted to the lower flanges of a pair of horizontally disposed, longitudinally extending, spaced parallel I-beams 86 and 88 which have their upper flanges welded to the lower sides of the overhead arch frames 22 and 24.

As shown in Fig. 11, the surfaces of the rollers 90 and 92 of the units 80 and 84 are concave in transverse section to conform to the outside diameter of the pipe, while the roller 94 of the unit 82 is shaped so as to roll the marginal edges of the pipe 78 inwardly past a true circumference. This shaping or working of the marginal metal causes it to stretch lengthwise of the edges, and the stretch is taken up by the welding metal as it cools and contracts, leaving the seam and marginal edges smooth.

Means are provided for supporting the pipe along the lower outside thereof, and comprise a plurality of rubber covered rollers 96, 98, 100, 102, 104, 106, 108, and 110, all having surfaces of concave cross section and of substantially identical construction. Each of the rollers is journaled on an axle shaft having its protruding ends mounted in upstanding brackets 112 which are bolted to the upstanding flanges of a horizontally disposed, longitudinally extending channel 114. The channel 114 is supported by a plurality of upstanding brackets 116 which are welded to the cross beams 20 in spaced relation at opposite sides of the channel.

The channel 114 may be vertically adjusted to accommodate different diameters of pipe by vertically disposed adjusting rods 118, each having its lower end threaded into a nut 120 which is welded to the underside of the top flange of its respective cross beam, and each having its upper end threaded into a nut 122 which bears against the bottom side of the web of the channel 114.

Means are also provided for embracing diametrically opposite sides of the pipe 78, and comprise a plurality of rubber covered rollers with surfaces of concave cross section, generally designated 124 and 126. These rollers and their mountings are all of substantially identical construction so that a detailed description of one will suffice for all. The rollers 124 are preferably equal in number to the rollers mounted in the channel 114, and are likewise mounted between the horizontally disposed flanges of a longitudinally extending, horizontally disposed channel 128. Bracket plates 130 are secured to the channel flanges by cap screws 132, and support the rollers 124. The channel 128 is welded to the upper ends of a plurality of outwardly and downwardly extending tubular arms 134 which are axially adjustable in sleeves 136 which are welded to the uprights of the arch frames at an angle of 45°. Each of the sleeves 136 is closed at its lower end by a welded head through which is threaded an adjusting screw 138. The inner end of each adjusting screw 138 abuts against the lower closed end of its arm 134 so that the position of the channel 128 and its rollers 124 may be adjusted to embrace various diameters of pipe, and the axial centers of the rollers will always be at the horizontal diameter of the pipe.

Likewise the rollers 126 are mounted between the flanges of a channel 140 by bracket plates 142 secured to the channel flanges by cap screws 144. The channel 140 is also supported by a plurality of outwardly and downwardly inclined tubular arms 146 which are axially adjustable in sleeves 148 welded to the arch frame uprights at an angle of 45°. The outer lower ends of each sleeve 148 have a head 150 welded therein through which is threaded an adjusting screw 152, the inner end of which abuts the lower closed end of its respective arm 146.

As shown most clearly in Figs. 4 and 5, means are provided for bracing the hanger plates 32, 34, 36 and 38 against side deflection, and comprise a plurality of inclined angle braces 154 and 156 which have their upper ends bolted to the lower flanges of the I-beams 86 and 88 and their lower ends welded to opposite sides of the hanger plates. As shown in Figs. 5 and 5A, the opposite sides of the hanger plates are provided with hardened wear inserts 158 and 160, which may be of welding rod material, for resisting the abrasive wear of the pipe seam edges sliding therealong and pinched thereagainst by the side squeeze rollers 124 and 126.

As shown most clearly in Figs. 3, 4, 7, and 8, means are provided for aligning and guiding the opposed edges of the open seam into proper position for welding, and comprise a plurality of rollers 162, 164, and 166 journaled between a pair of spaced parallel bars 168 and 170. The bars 168 and 170 are mounted on the lower ends of vertically disposed, longitudinally spaced, parallel adjusting screws 172 and 174 which extend slidably through cross plates 176 and 178, respectively, and which are welded to the upper and lower flanges of the I-beams 86 and 88. Adjusting nuts 180 and 182 are threaded on the screw 172 above and below the cross plates 176, and likewise adjusting nuts 184 and 186 are threaded on the screw 174, by means of which the frame carrying the rollers 162, 164, and 166 may be accurately positioned with respect to the pipe 78.

As shown most clearly in Figs. 7 and 8, each of the rollers comprises two coaxial disk-like plates 188 and 190 of equal diameter which embrace opposite sides of a relatively thin disk 192 of larger diameter. The entire assembly is secured together by a plurality of axially extending cap screws 194 which pass through the disks 190 and 192 and are threaded into the disk 188. The roller assembly is journaled on an axle shaft 196 by two axially spaced ball bearing assemblies 198 and 200. Opposite ends of the shaft 196 extend through the side bars 168 and 170, and are provided with threaded ends for receiving nuts 202 and 204.

That portion of the center disk 192 which extends beyond the surfaces of the disks 188 and 190 is slightly tapered as shown at 206 in Fig. 8. The center disk of roller assembly 164 is provided with a protruding outer edge of thinner cross section, as shown at 208, and the center disk of roller assembly 166 is of still thinner section, as shown at 210, so that the opposed edges of the pipe blank are gradually brought together by the action of the squeeze rollers, and into proper welding position.

The base frame 14, forward of the arch frames 22 and 24, is also provided with inverted U-shaped arch frames 212 and 214 rigidly welded thereon. The frames 212 and 214 have welded thereto downwardly and inwardly inclined tubular sleeves 216 and 218 symmetrically disposed at each side of the vertical center line of the machine, and of substantially identical construction. Each sleeve has a closed top end through which are threaded adjusting screws 220 and 222 with lock nuts 224 and 226, respectively. The inner ends of the adjusting screws abut against the upper ends of axially slidable plungers 228 and 230, respectively, the lower ends of which are pivoted to two pairs of horizontally disposed, longitudinally extending, spaced parallel bars 232 and 234, respectively. A plurality of hold-down rollers 236 and 238 are journaled between the pairs of bars 232 and 234. The rollers 236 and 238 engage and bear down on the marginal edges of the pipe 78 closely adjacent its seam so as to maintain firm contact between said edges and a water cooled back-up shoe 240 which is mounted inside of the pipe 78 on the forwardly projecting end 242 of a beam 244 welded to the plate 32. The shoe 240 is vertically slidable between clips bolted to the supporting beam, and is urged upwardly by a plurality of helical compression springs 246 positioned thereunder, and which rest upon the heads of vertically disposed axially slidable plungers 248. The lower ends of the plungers 248 rest upon conically disposed adjusting bolts 250 which are axially slidable through the beam end 242. The small end of each adjusting bolt 250 protrudes beyond the side of the beam end and is provided with a nut 252 by which it may be drawn axially to cam its plunger 248 upwardly and thereby increase the tension on its spring 246.

As shown most clearly in Fig. 9, the inside bars 232 and 234 of the roller mountings are provided with longitudinally disposed depending aprons 254 and 256 which form a trough for the welding flux supplied to the automatic welding heads 258 and 260 by a conduit 262. The conduit 262 leads from an overhead hopper 264 supported by a suitable framework mounted on the base of the machine. Welding rod 236 is supplied to the welding heads 258 and 260 from reels 268 suitably mounted above the machine.

The preformed pipe blanks are fed into and through the machine by the roller assemblies 80, 82 and 84 which are driven by chain sprockets keyed to their shafts and driven from a speed reducer 270 powered by a electric motor 272, through sprocket chains 274, 276, 278, and a sprocket chain 280 which interconnects the roller units 80 and 82. It is to be noted that the sprocket of roller unit 80 is smaller than the driving sprocket of unit 82 so that the roller of the unit 80 has a greater peripheral speed than the other two feed rollers. With this arrangement, joints of pipe may be fed into the machine in spaced relation, but the succeeding joint will travel at a greater speed and catch up and abut against the preceding joint so that a continuous and uninterrupted weld will be made at the welding heads. After the succeeding joint catches up and abuts against the preceding joint, the roller of the unit 80 will slip on the pipe surface until it passes therebeyond.

Although but one specific embodiment of this invention has been herein shown and described, it will be understood that numerous details of the construction shown may be altered or omitted without departing from the spirit of this invention as defined by the following claims.

I claim:

1. A pipe forming and welding machine comprising: a frame; a pair of cooperating rollers journaled on said frame for gripping and feeding a preformed pipe blank of substantially circular cross section and having a longitudinally extending slit therein, one of said rollers being positioned to engage the inner surface of the pipe blank at opposite sides of the slit, the other of said rollers being positioned to engage the outer surface of the pipe blank opposite to the inner roller, said rollers being shaped so as to work and shape the cross sectional contour of the pipe blank at opposite sides of the slit to smooth the edges adjacent the slit; power means for driving one of said rollers to feed the pipe blank through the machine; and automatic means for welding the seam to form a pipe.

2. A pipe forming and welding machine comprising: a frame; a pair of cooperating rollers journaled on said frame for gripping and feeding a preformed pipe blank of substantially circular cross section and having a longitudinally extending slit therein, one of said rollers being positioned to engage the inner surface of the pipe blank at opposite sides of the slit, the other of said rollers being positioned to engage the outer surface of the pipe blank opposite to the inner roller; the rollers having oppositely shaped but complementary transverse surface contours to tightly grip the blank, power means for driving one of said rollers to feed the pipe blank through the machine; opposed means for squeezing the edges of the slit substantially together to form a seam; and automatic means for welding the seam to form a pipe.

3. A pipe forming and welding machine comprising: a frame; a plurality of pairs of cooperating rollers journaled in longitudinally spaced relation on said frame for gripping and feeding a preformed pipe blank of substantially circular cross section and having a longitudinally extending slit therein, one of each pair of rollers being positioned to engage the inner surface of the pipe blank at opposite sides of the slit, the other of each pair of rollers being positioned to engage the outer surface of the pipe blank opposite to its corresponding inner roller, the engaging surfaces of one pair of rollers being shaped so as to shorten the radius of curvature of the marginal edges adjacent the slit of the pipe blank; a succeeding pair of cooperating rollers being shaped so as to return such marginal edges to substantially the same radius of curvature as the remainder of the pipe blank, power means for driving one of said rollers to feed the pipe blank through the machine; and automatic means for welding the seam to form a pipe.

4. A pipe forming and welding machine comprising: a frame; a plurality of pairs of cooperating rollers journaled in longitudinally spaced relation on said frame for gripping and feeding a preformed pipe blank of substantially circular cross section and having a longitudinally extending slit therein, one of each pair of rollers being positioned to engage the inner surface of the pipe blank at opposite sides of the slit, the other of each pair of rollers being positioned to engage the outer surface of the pipe blank opposite to its corresponding inner roller, the engaging surfaces of one pair of rollers being shaped so as to change the cross sectional contour of the marginal edges adjacent the slit of the pipe blank; a succeeding pair of cooperating rollers being shaped so as to return such marginal edges to substantially the same cross sectional contour as the remainder of the pipe blank; power means for driving one of said rollers to feed the pipe blank through the machine; opposed means for squeezing the edges of the slit substantially together to form a seam; and automatic means for welding the seam to form a pipe.

5. A pipe forming and welding machine comprising: a frame; a plurality of pairs of cooperating rollers journaled in longitudinally spaced relation on said frame for gripping and feeding a preformed pipe blank of substantially circular cross section and having a longitudinally extending slit therein, one of each pair of rollers being positioned to engage the inner surface of the pipe blank at opposite sides of the slit, the other of each pair of rollers being positioned to engage the outer surface of the pipe blank opposite to its corresponding inner roller, one pair of said rollers being shaped to roll the marginal edges along the slit inward beyond the circumference of a circle, and a succeeding pair of said rollers being shaped to roll such edges outward to the true circumference of the finished pipe; power means for driving one of said rollers to feed the pipe blank through the machine; and automatic means for welding the seam to form a pipe.

6. A pipe forming and welding machine comprising: a frame; a plurality of pairs of cooperating rollers journaled in longitudinally spaced relation on said frame for gripping and feeding a preformed pipe blank of substantially circular cross section and having a longitudinally extending slit therein, one of each pair of rollers being positioned to engage the inner surface of the pipe blank at opposite sides of the slit, the other of each pair of rollers being positioned to engage the outer surface of the pipe blank opposite to its respective inner roller, one pair of said rollers being shaped to roll the marginal edges along the slit inward beyond the circumference of a circle, and a succeeding pair of said rollers being shaped to roll such edges outward to the true circumference of the finished pipe; power means for driving one of each pair of rollers to feed the pipe blank through the machine, the peripheral speed of the first driven roller being greater than the succeeding rollers, whereby a blank fed into the machine in spaced relation to a preceding blank will catch up with and abut against such preceding blank; and automatic means for welding the seam to form a pipe.

7. A pipe forming and welding machine comprising: a frame; a pair of cooperating rollers journaled on said frame for gripping and feeding a preformed pipe blank having a longitudinally extending slit therein, one of said rollers being positioned to engage the inner surface of the pipe blank at opposite sides of the slit, the other of said rollers being positioned to engage the outer surface of the pipe blank opposite to the inner roller; power means for driving one of said rollers to feed the pipe blank through the machine; a back-up contact shoe on said frame positioned within the pipe blank and underlapping the marginal edges of the slit; said shoe having a transverse profile conforming to the inner curvature of the pipe blank where it contacts the blank; hold-down rollers for pressing such marginal edges firmly against said shoe; and automatic means for arc welding the seam to form a pipe.

8. A pipe forming and welding machine comprising: a frame; a pair of cooperating rollers journaled on said frame for gripping and feeding a preformed pipe blank of substantially circular cross section and having a longitudinally extending slit therein; power means for driving one of said rollers to feed the pipe blank through the machine; an elongated back-up contact shoe on said frame positioned within the pipe blank and underlapping the marginal edges of the slit; a plurality of longitudinally spaced hold-down rollers for pressing such marginal edges firmly against said shoe; and automatic means positioned in a space between said hold-down rollers for arc welding the seam to form a pipe.

9. A pipe forming and welding machine comprising: a frame; a pair of cooperating rollers journaled on said frame for gripping and feeding a preformed pipe blank of substantially circular cross section and having a longitudinally extending slit therein, one of said rollers being positioned to engage the inner surface of the pipe blank at opposite sides of the slit, the other of said rollers being positioned to engage the outer surface of the pipe blank opposite to the inner roller; power means for driving the outer of said rollers to feed the pipe blank through the machine; a back-up contact shoe on said frame positioned within the pipe blank and underlapping the marginal edges of the slit; a plurality of longitudinally spaced hold-down rollers for pressing such marginal edges firmly against said shoe, the shoe extending under a plurality of the hold-down rollers; and automatic means positioned opposite to and cooperating with said shoe for arc welding the seam to form a pipe.

10. A pipe forming and welding machine comprising: a frame; a pair of cooperating rollers journaled on said frame for gripping and feeding a preformed pipe blank of substantially circular cross section and having a longitudinally extending slit therein; power means for driving one of said rollers to feed the pipe blank through the machine; a plurality of rollers journaled on said frame, each having a radial fin positioned to extend into the blank slit for aligning the marginal edges thereof; a fluid cooled back-up contact shoe on said frame positioned within the pipe blank to underlap the marginal edges of the slit in sliding contact with said edges and bridging the slit; hold-down rollers for pressing such marginal edges firmly against said shoe; and automatic means positioned opposite to and cooperating with said shoe for arc welding the seam to form a pipe.

11. A pipe forming and welding machine comprising: a frame; a pair of cooperating rollers journaled on said frame for gripping and feeding a preformed pipe blank of substantially circular cross section and having a longitudinally extending slit therein, one of said rollers being positioned to engage the inner surface of pipe blank at opposite sides of the slit, the other of said rollers being positioned to engage the outer surface of the pipe blank opposite to the inner roller, said rollers being shaped so as to work and shape the cross sectional contour of the pipe blank to smooth the edges of the slit; power means for feeding the pipe blank through the machine and automatic means for arc welding the same to form a pipe.

12. A pipe forming and welding machine comprising: a frame; a pair of cooperating rollers journaled on said frame for gripping and feeding a preformed pipe blank of substantially circular cross section and having a longitudinally extending slit therein, one of said gripping and feeding rollers being positioned to engage the inner surface of the pipe blank at opposite sides of the slit, the other of said gripping and feeding rollers being positioned to engage the outer surface of the pipe blank opposite to the inner roller; power means for feeding the pipe blank through the machine; opposed means for squeezing the edges of the slit substantially together to form the same and automatic means for welding the same to form a pipe.

13. A pipe forming and welding machine comprising: a frame; a plurality of pairs of cooperating rollers journaled in longitudinally spaced relation on said frame for gripping and feeding a preformed pipe blank of substantially circular cross section and having a longitudinally extending slit therein, one of each pair of rollers being positioned to engage the inner surface of the pipe blank at opposite sides of the slit, the other of each pair of rollers being positioned to engage the outer surface of the pipe blank opposite to its corresponding inner roller; the engaging surfaces of one pair of rollers being shaped so as to shorten the radius of curvature of the marginal edges adjacent the slit of the pipe blank; a succeeding pair of cooperating rollers being shaped so as to return such marginal edges to substantially the same radius of curvature as the remainder of the pipe blank; power means for feeding the pipe blank through the machine and automatic means for arc welding the same to form a pipe.

CHARLES A. BABBITT.

REFERENCES CITED

The following references are of record in the file of this patent:

UNITED STATES PATENTS

| Number | Name | Date |
| --- | --- | --- |
| 1,661,970 | Sessions | Mar. 6, 1928 |
| 1,874,399 | White | Aug. 30, 1932 |
| 1,914,518 | Martin | June 20, 1933 |
| 1,976,343 | Heineman | Oct. 9, 1934 |
| 2,139,211 | Sessions | Dec. 6, 1938 |
| 2,322,221 | Cereghino | June 22, 1943 |
| 2,385,109 | Selter et al. | Sept. 18, 1945 |

FOREIGN PATENTS

| Number | Country | Date |
| --- | --- | --- |
| 616,710 | Germany | Aug. 3, 1935 |